United States Patent [19]

Svatek

[11] 4,226,510
[45] Oct. 7, 1980

[54] SOUND MODULE FOR MOTION PICTURE CAMERAS

[75] Inventor: Thomas A. Svatek, Carlisle, Mass.

[73] Assignee: Polaroid Corporation, Cambridge, Mass.

[21] Appl. No.: 32,950

[22] Filed: Apr. 24, 1979

[51] Int. Cl.³ ............................................. G03B 31/04
[52] U.S. Cl. ........................................ 352/31; 352/72
[58] Field of Search ...................... 352/14, 27, 29, 31, 352/72

[56] References Cited

U.S. PATENT DOCUMENTS

| | | | |
|---|---|---|---|
| 3,848,977 | 11/1974 | Scholz | 352/14 |
| 3,888,570 | 6/1975 | Stella | 352/29 |
| 3,893,756 | 7/1975 | Scholz | 352/29 |
| 3,902,797 | 9/1975 | Thomas | 352/29 |
| 3,905,690 | 9/1975 | Scholz | 352/27 |
| 3,909,120 | 9/1975 | Stella | 352/29 |

OTHER PUBLICATIONS

U.S. Patent Application Ser. No. 869,131.

Primary Examiner—Monroe H. Hayes
Attorney, Agent, or Firm—David R. Thornton

[57] ABSTRACT

A sound module for motion picture cameras of the type adapted to receive a multi-purpose cassette in which separate photographic film and audio tape strips are commonly wound on cassette-contained supply and takeup spools but directed through separate paths between the spools, such paths including distinct photographic and audio or sound stations. The module carries a complete complement of sound recording components including a transducing head, a capstan drive and motor for advancing a run or loop of the sound tape past the transducing head and an organization of fixed and movable sound tape guiding members by which the positional relationship of the tape and the transducing head is accurately controlled. All components of the module are ultimately supported by a single supporting plate secured to the internal camera chassis structure by vibration damping means. The module is also associated with camera control functions in a way such that cassette insertion and removal from the camera is unimpeded by sound module carried components.

14 Claims, 15 Drawing Figures

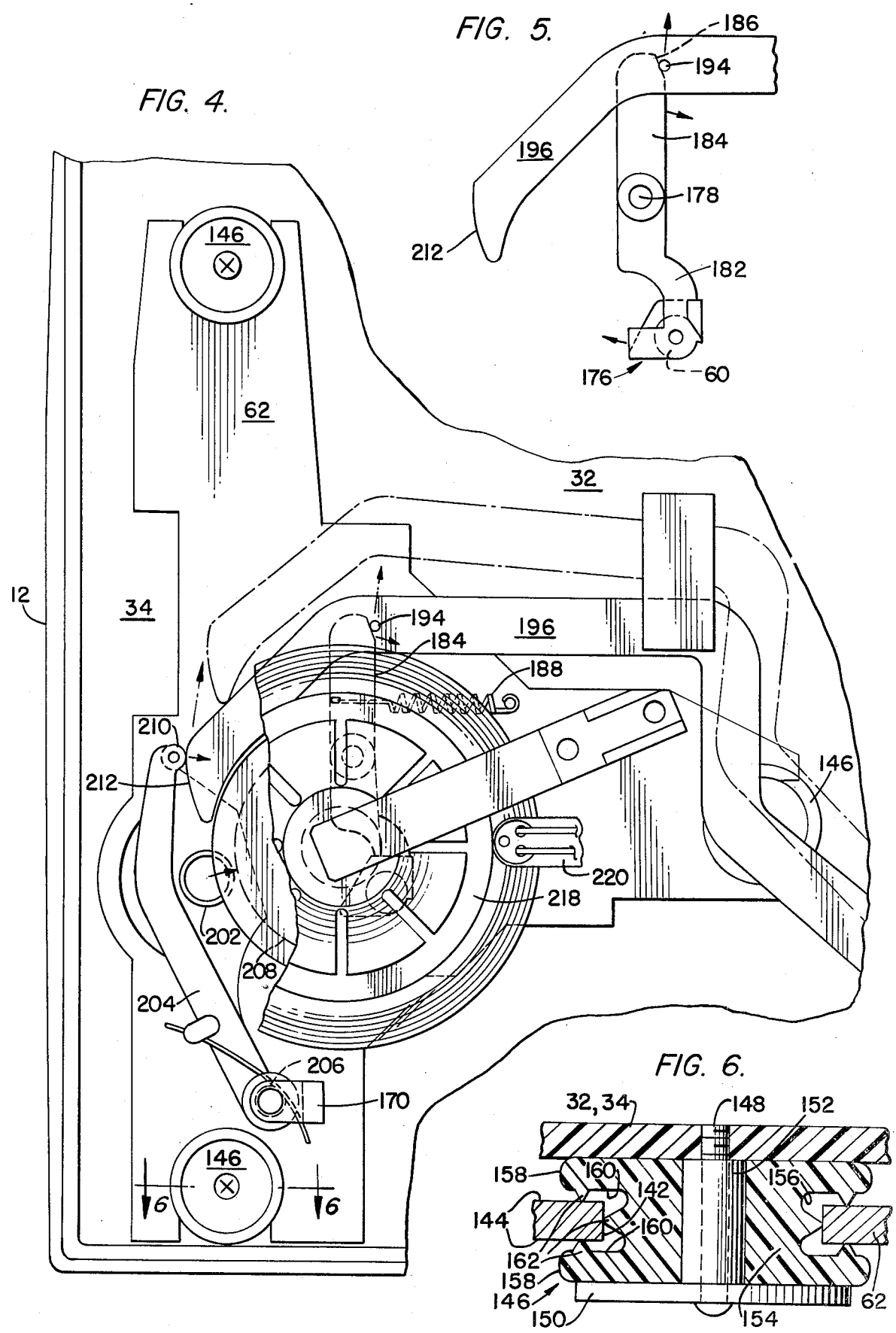

SOUND MODULE FOR MOTION PICTURE CAMERAS

BACKGROUND OF THE INVENTION

This invention relates to sound reproduction for motion picture systems and, more particularly, it concerns improvements in audio components for use in motion picture cameras of a type adapted to receive a cassette containing separate photographic film and audio tape strips guided to respective camera mounted photographic and audio stations to and from common takeup and supply spools within the cassette.

In a commonly assigned copending application Ser. No. 869,131, filed Jan. 13, 1978, in the name of E. H. Land et al, several alternative embodiments of a multipurpose film cassette are disclosed in which a photographic film strip and a magnetic audio tape are interwound in alternate convolutions on supply and takeup spools rotatably supported within the cassette. The respective strips are guided in separate paths between the spools to pass in operative relationship through photographic and audio stations defined in part by the cassette and in part by the recording camera and playback projector designed to receive the cassette. The organization of components and the operation of same at the photographic station are now well known and physically embodied in the motion picture system available commercially under the name "POLAVISION," a registered trademark of Polaroid Corporation, Cambridge, Massachusetts. The audio station, however, has not been incorporated in a commercial embodiment of the system to date.

Prior to the development represented by the disclosure of copending application Ser. No. 869,131, motion picture systems of the aforementioned type have been adapted for sound by providing the film strip with a relatively narrow marginal strip of magnetic material for receiving an audio signal. An example of such a system is disclosed in U.S. Pat. No. 3,848,977, issued Nov. 19, 1974 to Donald T. Scholz and assigned to the assignee of the present invention. A principle advantage resulting from the use of separate photographic film and audio tape strips, as compared with a film strip mounted audio signal carrier, is that the separate audio tape provides increased audio signal capacity needed for high fidelity sound reproduction. Full attainment of high fidelity sound reproduction consistent with the capacity of the separate audio tape, however, has required solution to problems encountered with achieving the physical characteristics of components required to record quality audio signals on the magnetic tape strip particularly in the recording camera. It is important, for example, that the audio components are essentially free of vibrations to avoid tape flutter and other undesirable noise creating characteristics. Because of the need at the photographic station for oscillating or reciprocating components to incrementally advance the film strip, the audio components must be completely isolated from vibration developed by such components of the photographic station. In addition, the audio tape must be advanced in complete synchronism with the film strip and must be capable of repeated start and stop operation peculiar to amateur cinematography. Finally, the audio components of the camera must not interfere in any way with simple loading of the cassette into the camera and must, therefore, be arranged for automatic positioning in relation to the cassette-contained audio tape.

SUMMARY OF THE INVENTION

In accordance with the present invention, a sound module is provided for motion picture cameras of the type adapted to receive cassette-contained separate photographic film and audio tape strips and by which the problems heretofore encountered in the recording of audio signals for high fidelity sound reproduction are substantially overcome. The module includes a head housing and sound mounting plate assembly from which the working components of a tape recording audio station are supported in a manner to isolate the audio station from vibrations originating in the camera body and to position a recording run of the cassette-contained audio tape in precise registration with a magnetic transducing head. The housing and plate assembly is carried by a secured vibration damping means to the camera body. Audio tape positioning relative to the transducing head and a drive capstan is by components either fixed to the head housing, the mounting plate or movable toward the head housing under a relatively heavy spring bias so that in operation, the movable components are effectively integrated with the housing and mounting plate. Also, such tape positioning components are bidirectional in the sense that the position of the tape run in operative relation with the transducing head is completely controlled laterally or in the plane of the tape and confined to planes tangential to the transducing head face.

A cam system is provided by which movable components of the sound module are moved against their respective biases to a retracted position automatically when the camera is conditioned to receive a cassette. On completion of the cassette loading procedure, all movable components of the sound module are advanced automatically either to a fully operative position or to a ready position in the case of components which are sensitive to a fully operative position under static conditions, such as elastomeric roller surfaces which may take a set to a noncircular surface configuration. A second stage cam system is provided by which components in the ready condition are advanced to a fully operative condition upon actuation of camera controls causing movement of the film strip and the audio tape. Upon conditioning the camera for removal of the cassette, all movable audio components, including the audio tape run positioned adjacent the transducing head, are returned automatically to the retracted position or to a position in which the cassette may be removed from the camera without interference by audio station components.

A principal object of the present invention is, therefore, to provide an improved sound recording module particularly suited for use in motion picture cameras of the type referred to for the reproduction of high fidelity sound and by which camera and cassette manipulation is virtually uneffected by the inclusion of sound components. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 4 is an enlarged side elevation similar to FIG. 2 but from the side of the camera body opposite from that illustrated in FIG. 2;

FIG. 5 is a fragmentary plan view illustrating components shown also in FIG. 4;

FIG. 6 is an enlarged fragmentary cross-section on line 6—6 of FIG. 4;

DETAILED DESCRIPTION OF THE PREFERRED EMBODIMENTS

Figure 1:
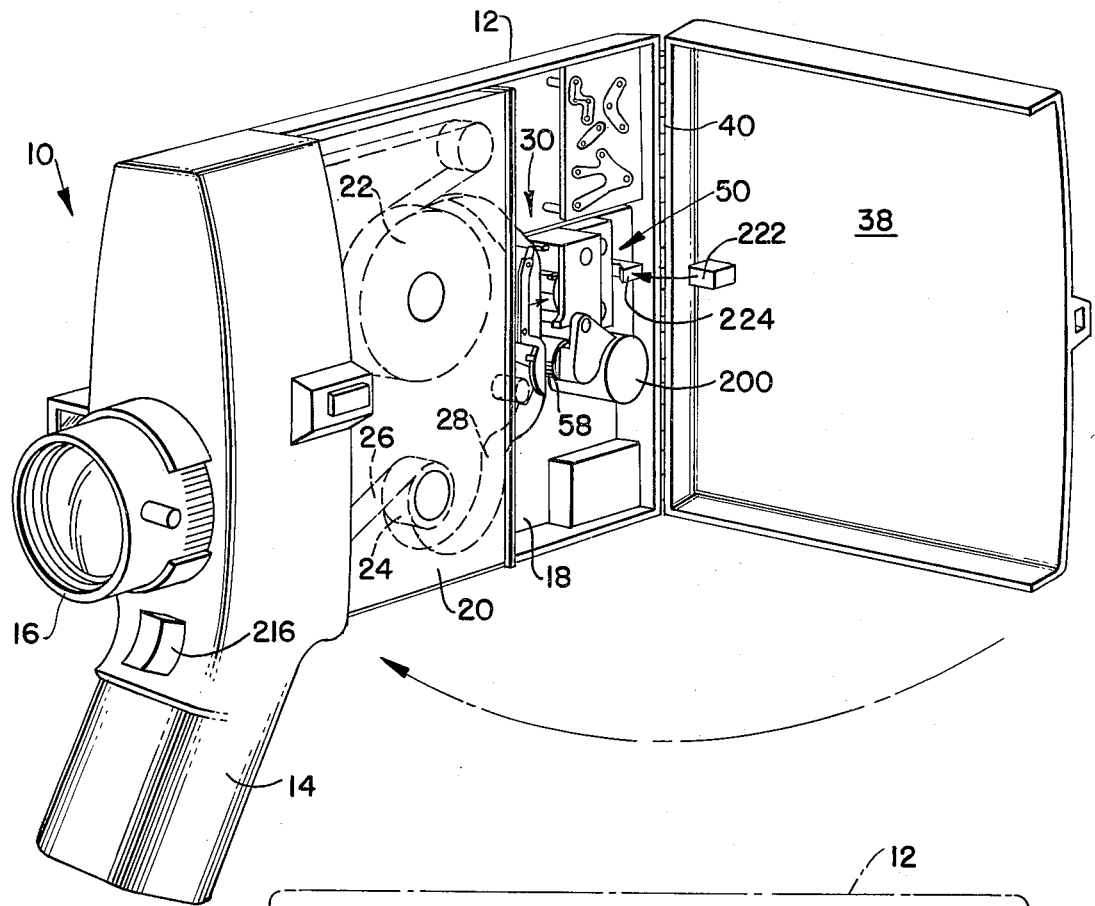
FIG. 1 is a perspective view of a motion picture camera incorporating the sound module of the present invention.

In FIG. 1 of the drawings, a motion picture camera is generally designated by the reference numeral 10 and shown generally to include a housing or body 12 having a pistol grip 14 depending from the front end thereof. An objective lens 16 is mounted on the front end of the body and forms part of a photographic station, a term used hereinafter to delineate those internal camera components which are not shown in the drawings but which serve a photographic function as distinguished from the sound reproduction function to which the present invention is primarily directed. Also in this respect, reference may be made to the previously cited U.S. Pat. No. 3,848,977 as well as to numerous commonly assigned U.S. patents relating to the commercially available "POLAVISION" camera for a complete understanding of the photographic components in the camera 10.

The camera body 12 is also similar to previous camera bodies of the general type represented by the camera 10 to the extent that it defines a chamber or pocket 18 to receive a multi-purpose cassette 20. As shown in FIG. 1 and also partially in FIG. 2 of the drawings, the cassette 20 has an exterior configuration resembling a rectangular parallelepiped and contains internally a pair of coplanar supply and takeup spools 22 and 24. As described in the aforementioned copending application Ser. No. 869,131, opposite ends of a photographic film strip 26 and a magnetic audio or sound tape 28 are fixed to the spools 22 and 24 to be interwound in alternate convolutions on the spools. The film strip 26 and the sound tape 28, however, pass in separate paths between the spools. Specifically, the film strip 26 passes from the supply spool to a photographic station at which it is exposed in successive image frames to light passing the lens 16 and then returned to the takeup spool 24. The sound tape 28, on the other hand, passes directly from the supply spool 22 to an audio station 30 and back to the takeup spool 24.

Figure 2:
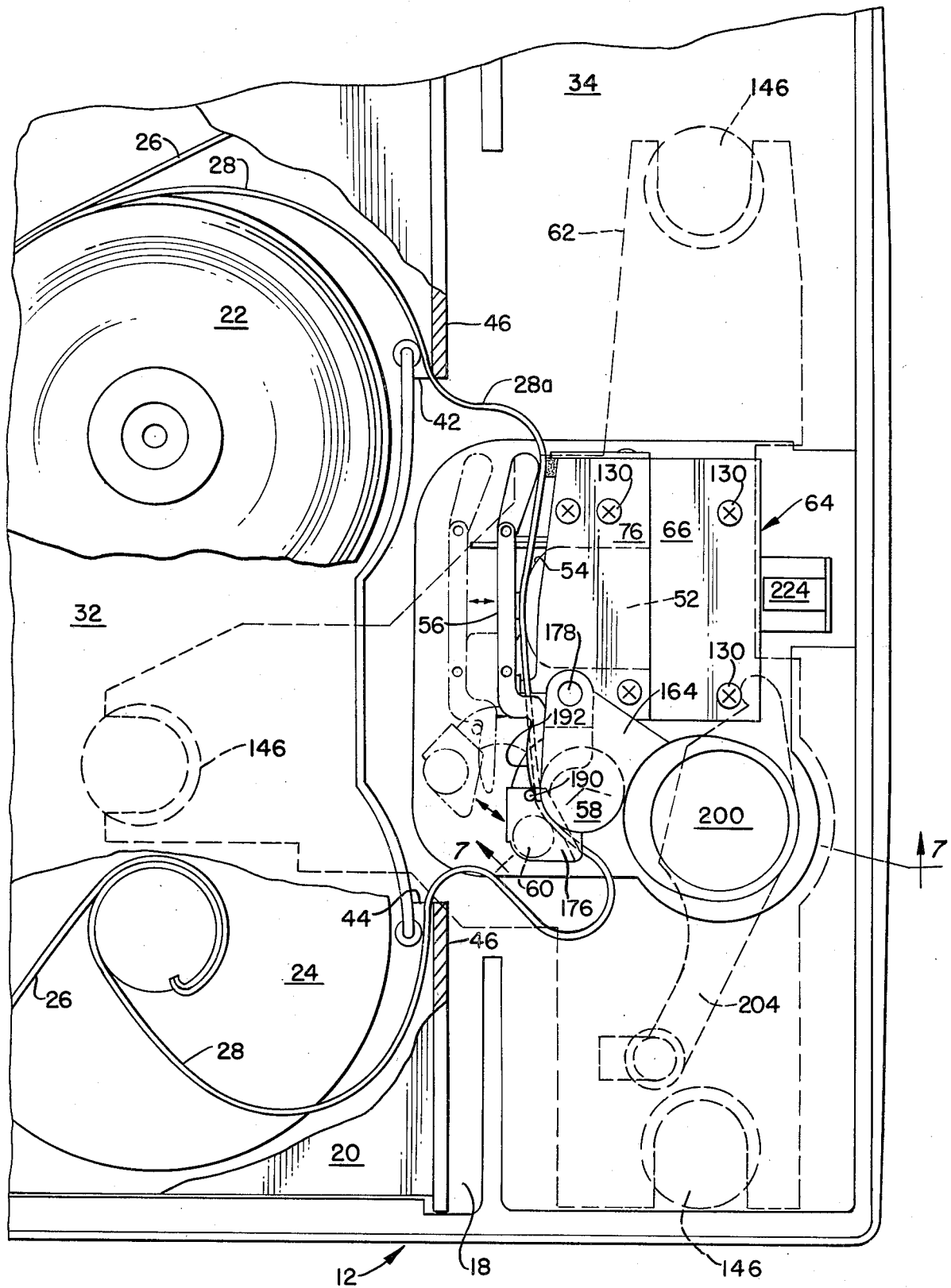
FIG. 2 is an enlarged fragmentary side elevation of the camera body illustrated in FIG. 1.

Since the present invention is concerned principally with the construction and operation of components at the audio station 30, the audio station components will be described in considerable detail below. Also in this respect, a full understanding of the support and housing of components at the audio station 30 by the camera body 12 will be facilitated by a brief summary of the internal structure of the body 12. In FIGS. 2 and 4 of the drawings, opposite sides of a central, generally planar wall structure 32 are shown. The wall structure serves a chassis function in the camera body 12 and lies approximately on the central fore and aft vertical plane of the camera body as may be seen in FIGS. 7A and 7B. The front surface of the wall 32 is presented in FIGS. 1 and 2, for example, and defines part of the cassette receiving pocket or chamber 18. The back surface of the wall 32 is presented to view in FIGS. 3 and 4 of the drawings to establish a component receiving chamber with a back casing wall 37 partially shown in FIGS. 7A and 7B. In accordance with the invention, the wall 32 extends rearwardly as a sound module support wall 34 having a centrally positioned cutout or window 36. The cassette receiving chamber 18 as well as the audio chamber defined by the wall extension 34 are adapted to be closed by a door 38 pivoted by a hinge 40 at the rear end of the casing 12 and movable from the open position shown in FIG. 1 to a closed and latched position overlying the cassette 18 and the audio station 30.

The audio station 30, as shown in FIG. 2, is established in part by the cassette 20 in the sense that a recording loop 28a of the sound tape begins at a tape exit 42 and ends at a tape entrance 44, both of which are located in a top wall 46 of the cassette. In all other respects, the audio station is comprised exclusively of working components forming part of a sound module designated generally by the reference numeral 50.

Working components of the sound module 50 together with the positional relation thereof to the tape loop 28a, are shown in FIG. 2 to include a transducing head 52 having a tape engaging face 54, a tape guide shoe 56 movable between operative and retracted positions represented respectively by the solid and phantom lines in FIG. 2, a rotatable tape loop driving capstan 58 and a pinch roller 60 supported for pivotal movement between operative and retracted positions also represented by respective solid and phantom lines in FIG. 2. These components are supported on two major structural components of the module 50, namely, a mounting plate 62 supported from the back side of the wall 32 and wall extension 34 (see FIG. 4) and a transducer head housing 64 supported by the mounting plate to be presented through the window 36 to the front side of the wall 32 and wall extension 34.

Figure 9:
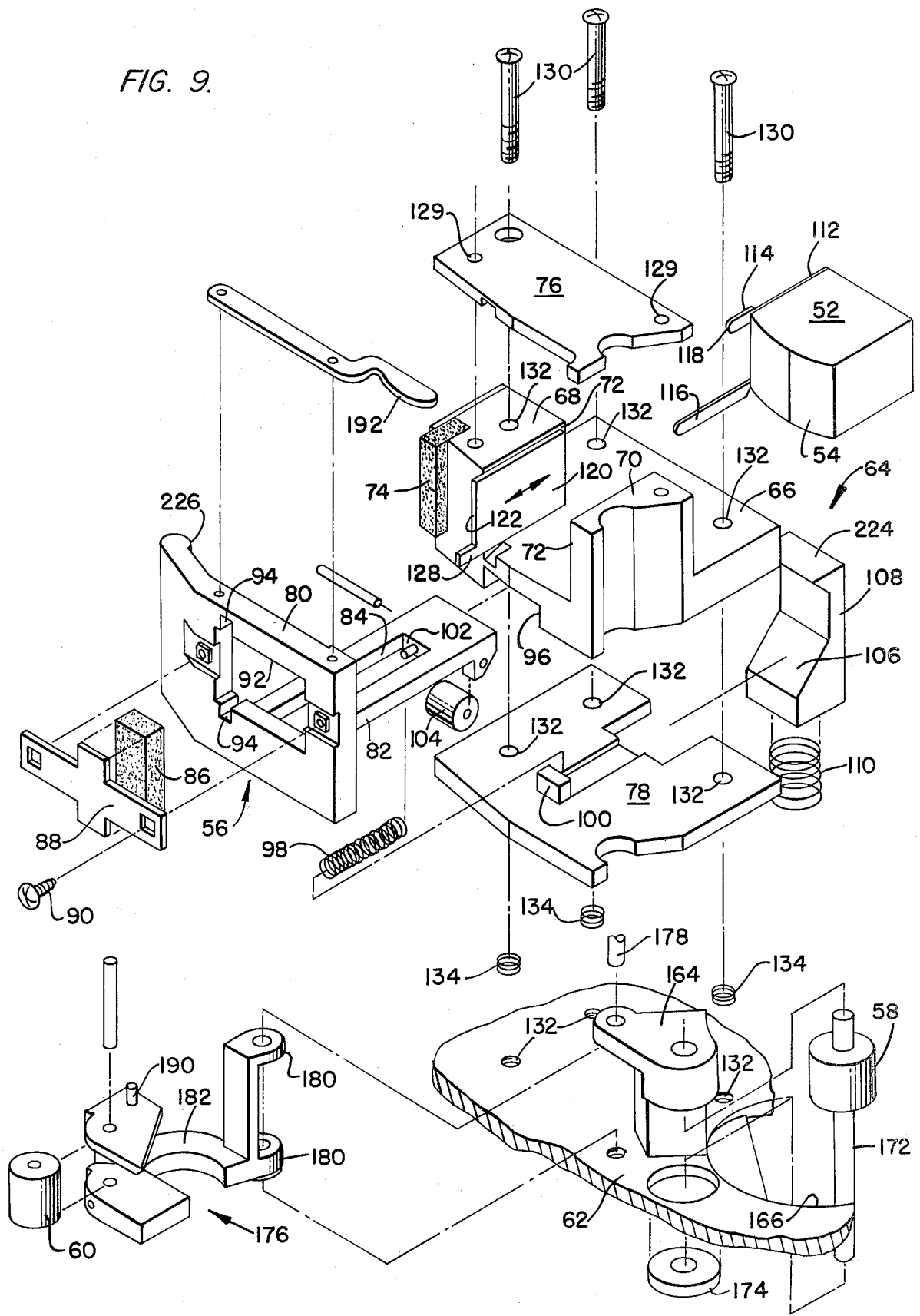
FIG. 9 is an exploded perspective view of components incorporated in the sound module of the present invention.

A more complete understanding of components supported directly by the mounting plate 62 and by the head housing 64 may be had by reference to FIG. 9 of the drawings. As shown, the head housing 64 includes a housing block 66 having a pair of integral upstanding posts or standards 70 defining spaced, mutually facing planar surfaces 72 spaced by a distance slightly in excess of the exterior width of the transducing head 52. A tape drag felt 74 is supported from the front face of the standard 68 to be positioned upstream from the head 52 in terms of the direction of travel by the tape loop 28a past the head. The housing 64 is further comprised of a top plate 76 adapted to be secured against the standards 68 and 70 and against the head 52 to secure it rigidly in the housing, and a bottom plate 78 adapted to seat between the bottom of the block 66 and the mounting plate 62 in a manner to be described.

The guide shoe 56 is an integral member defined by a frame-like guide wall portion 80 upstanding at right angles from a slide portion 82 having an elongated aperture 84 formed therein. A felt pressure pad 86 is supported from the guide wall 80 resiliently by a felt pad spring 88 secured to the back of the wall portion 80 by screws 90 to be positioned in a generally rectangular opening or window 92 in the wall portion 80. Also it will be noted that the window 92 is provided with top and bottom slot-like extensions 94 near one side thereof. The slide portion 82 of the guide shoe 56 is received between the base plate 78 and a groove or way 96 formed in the bottom of the block 66. A compression spring 98 positioned in the slot 84 abuts at one end against a lug 100 upstanding from the bottom plate 78 and at the other end against the front edge 102 of the slot 84. Thus the compression spring 98 imposes a bias on the guide shoe 56 in a direction tending to retain it against the front face of the housing block 66. The free end of the slide portion 82 carries a follower roller 104 adapted to engage an inclined face 106 on a ramp member 108 movable between protruding and depressed positions and biased upwardly toward its protruding position by a relatively heavy compression spring 110 for reasons which will become apparent from the description of operation to follow.

It will be noted that one side of the transducing head 52, specifically the side thereof to be positioned upstream in the context of tape travel past the head, carries a fixed tape guide 112 of thin plate-like form and having inner and outer fingers or legs 114 and 116 projecting from the face 54 of the head toward the wall 80 of the guide shoe 56. As may be seen in FIGS. 13 and 14 of the drawings, the legs 114 and 116 are spaced by a distance slightly larger than the width of the audio tape 28 to position the tape laterally in the plane thereof with respect to the face 54 of the head 52. Further, it will be noted that the inner leg 116 is of a length so as to extend through the bottom slot formation 94 in the wall 80 of the guide shoe 56 when the latter is in a retracted position spaced from the face 54 of the transducing head. By spanning this distance, it will be appreciated that the leg 116 will engage the inner edge of the tape 28 as the cassette 20 is inserted into the well 18 of the camera body 12. The outer leg 114, on the other hand, is provided with a rounded free end 118 which projects from the head face 54 by a distance to be received in the upper slot 94 of the guide wall window 92 but only when the guide shoe 56 is advanced toward the head face 54 to an operative position in which the backup pad 86 constrains the tape loop 28a against the face 54 of the transducing head. Thus it will be seen that the fixed guide 112 coupled with advancement of the guide shoe 56 from its retracted position to its operative position precisely controls the position of the tape loop 28a in relation to the head face 54.

Because the outer leg 114 of the fixed guide 112 represents a potential obstruction to removal of the tape loop 28a with the cassette 20 from the camera, a tape ejector slide 120 is mounted for movement so that a front edge 122 thereof may be moved from a retracted position behind the face 54 of the head 52 to an extended position in which the edge 122 is aligned with the rounded end 118 on the outer leg 114 of the fixed guide 112. Again as shown in FIG. 9 together with FIGS. 13 and 14, the standard 68 of the housing block 66 is slotted to receive a compression spring 124 acting against a pin 126 carried by the slide 120 to bias the ejector slide to the extended or ejecting position thereof. Movement from the extended position to the retracted position is effected by a projecting abutment 128 engageable with the wall 80 of the guide shoe 56 when the latter is advanced to its operative position with the backup pad 86 retaining the tape loop against the face 54 of the head 52.

Also as shown in FIG. 9 of the drawings, the supporting components of the transducing head housing 64, namely the block 66, the top plate 76 and the bottom plate 78 are adapted to be secured against one another as a rigid unit. The top plate is secured against the standards 68 and 70 and firmly against the head 52 by screw bolts (not shown) but extending through holes 129. The assembly of the top plate 76, head 52 and block 66 is drawn against the mounting plate 62 by three screw bolts 130 which extend through aligned apertures 132 in these components, respectively. Three relatively heavy compression springs 134 extend between the mounting plate 62 and the bottom plate 78. Thus as the screw bolts 130 are drawn into the mounting plate 62, the components of the head housing 64 will be compressed under the bias of the springs 134 and, moreover, will be vibrationally isolated from the plate 62 by the springs 134. By using three such screw bolts 132, moreover, a universal angular adjustability of the head housing 64 with respect to the mounting plate 62 can be effected.

Figure 12:
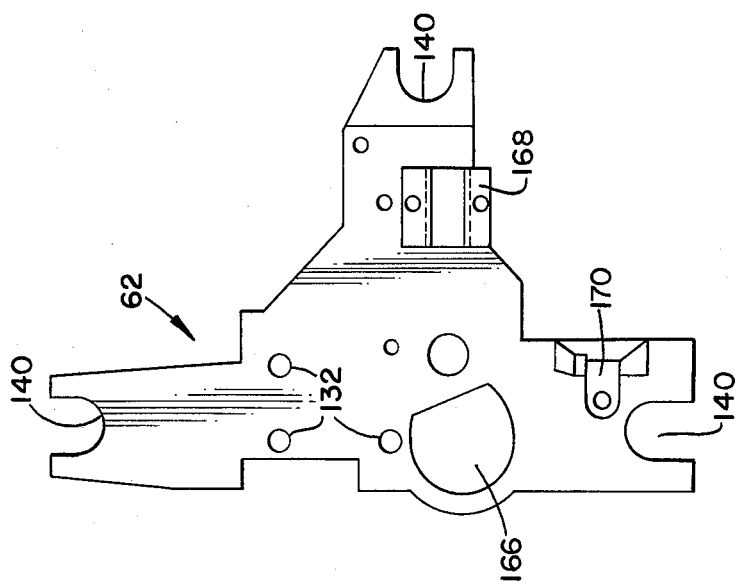
FIG. 12 is a bottom plan view of the mounting plate illustrated in FIG. 10.
Figure 11:
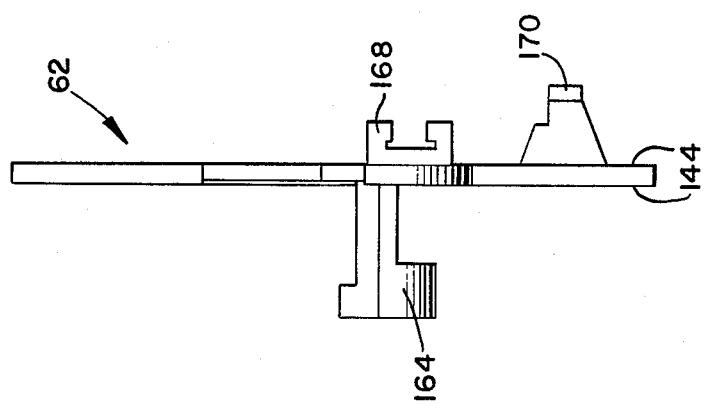
FIG. 11 is a side elevation of the mounting plate shown in FIG. 10.
Figure 10:
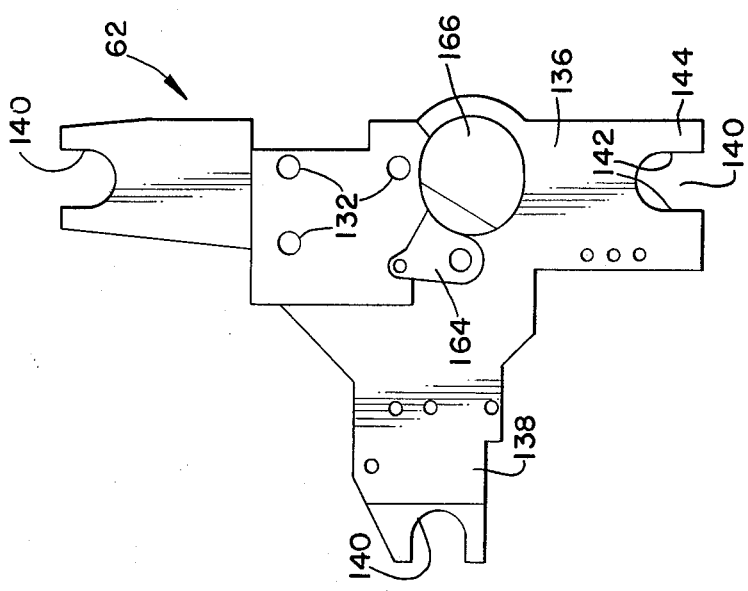
FIG. 10 is a top plan view of a sound module mounting plate of the present invention.

As shown in FIGS. 10–12 of the drawings, the mounting plate 62 is of a generally T-shaped configuration to establish a double-ended base portion 136 from which a central leg portion 138 extends. Each of the leg portions thus constituted is formed with an outwardly opening U-shaped cutout or slot 140 to establish a pair of diametrically opposed edge surfaces 142 joining at right angles with oppositely facing planar faces 144.

As shown most clearly in FIGS. 4 and 6 of the drawings, the support plate 62 is secured to the camera body wall 32 and wall extension 34 by three post-like supports 146 positioned to receive the slots 140 at the ends of each of the leg portions of the support plate 62. As shown in FIG. 6, each support 146 includes a central screw bolt 148 drawn into the support wall 32, 34 against a rigid washer-like disc 150 and a spacer sleeve 152. Secured by this assembly is an elastomeric grommet 154 of low durometer polyurethane and having an axial cross-sectional configuration to define an annular body having an outer peripheral surface 156. The body thus formed terminates in a pair of a enlarged diameter flanges 158 having mutually facing inner surfaces 160. Each of the peripheral and mutually facing inner surfaces 156 and 160 is provided with a tapered load bearing formation 162 to engage the respective diametrically opposed edges 142 and oppositely facing planar surfaces 144 on the support member 62. As a result of this support and in particular the tapered load bearing formations 162, vibrational movement between the camera body wall structure 32, 34 and the support plate 62 will be isolated by the grommet 154 in a manner such that increased amplitude of such vibrational movement will be oppposed by increased volume of the elastomeric polyurethane material from which the grommet 154 is formed.

With reference again to FIGS. 10–12 of the drawings, it will be noted that the mounting plate 62, specifically the body portion 136 thereof, is formed with an integral upstanding capstan bracket 164 adjacent a motor shaft opening 166. As shown in FIGS. 11 and 12, the bottom of the plate 62 carries a depending speed monitor support 168 and an integral depending motor arm pivot bracket 170.

Again as shown in FIG. 9, the capstan 58 includes a central shaft 172 adapted to be journalled at one end in the bracket 164 and at its lower end in a journal 174 secured to the support plate 62. The capstan bracket 64 further defines a pivotal support for a pinch roller mount 176. Although the mount 176 is ruggedly constructed to support the pinch roller 60 at opposite ends and also to engage a capstan bracket supported pin 178 through widely spaced pivot lugs 180, the pinch roller 60 is spaced from the lugs 180 by an arm 182 which lies below the lower edge of the transducing head face 54 so as to not interfere in any way with the audio tape loop 28a.

As shown in FIGS. 4 and 5 of the drawings, the pin 178 to which the pinch roller mount 176 is fixed by the lugs 180, extends through the mounting plate 62 and supports on the back side or bottom of the plate 62, an arm 184 having a cam face 186 at one end thereof. The arm 184 is secured also to the pin 178 and thus pivots as a unit with the pinch roll mount 176. A pinch roll tension spring 188 (FIGS. 3 and 4) extends from the mounting plate 62 to the arm 184 to bias the assembly of the pinch roll mount 176 and the arm 184 in a direction tending to urge the pinch roller 60 against the capstan 58. The mount 176 is pivotally moved to a retracted position against the bias of the spring 188 by a follower pin 190 adapted to be engaged by a cam finger 192 secured to the top of the wall portion 80 of the guide shoe 56. With reference again to FIG. 5, it is to be noted that upon pivotal movement of the pinch roller mount 176 from its retracted position toward its operative position wherein the pinch roller 60 engages the tape loop 28a to retain it against the capstan 58, the cam face 186 on the arm 184 will engage a pin 194 on a control arm 196, the construction and function of which will be described in more detail below.

The capstan 58 is adapted to be driven by an electric motor 200 through a drive train illustrated most clearly in FIGS. 2, 4 and 7 of the drawings. As shown in these figures, the motor 200 includes a drive shaft 202 at one end thereof secured to a motor support arm 204. The motor thus extends through the motor slot 166 in the support plate 62 to the arm 204 which is supported pivotally from the bracket 170 depending from the support plate 62. A coil spring 206 (FIGS. 3 and 4) at the bracket 170 biases the arm 204 in a direction tending to move the drive shaft 202 into frictional engagement with a drive wheel 208 coupled for rotation with the shaft 172 of the capstan 58. The arm 204 carries at its free end a follower roller 210 in engagement with a cam face 212 at the end of the control arm 196 previously described with reference to FIGS. 4 and 5 above.

Figure 3:
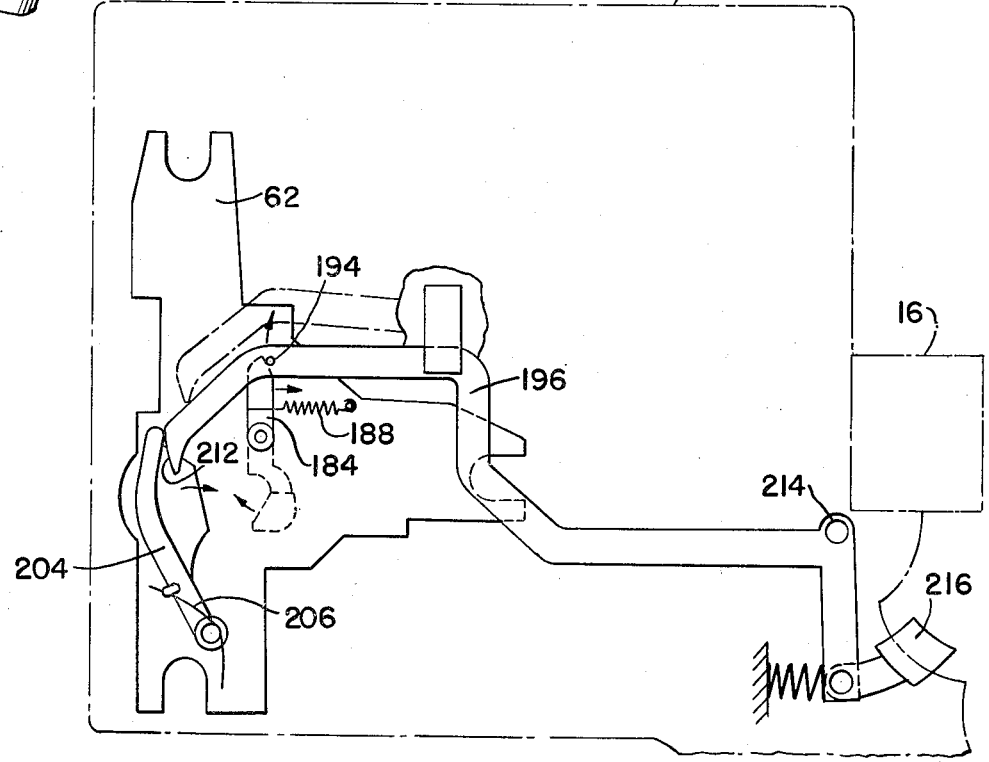
FIG. 3 is a side elevation of components in relation to the outline of the camera illustrated in FIG. 1.

As shown in FIG. 3, the control arm 196 is pivotally supported from the wall 32 by a pin 214 near the front end of the camera 10. In accordance with prior practice, the camera 10 is provided with a manually actuated control member or trigger 216 by which start and stop operation of the camera may be controlled by an operator. When the trigger 216 is depressed, a photographic station drive motor is energized to rotate the takeup spool 24 and otherwise advance the film strip 26 incrementally to successive frame positions behind the lens 16 in accordance with conventional motion picture operation. The sound motor 200 is energized simultaneously upon depression of the trigger 216 by appropriate electric circuitry (not shown). The control arm 196 is also connected with the trigger 216 so that depression of the trigger will pivot the control arm from the solid line position shown in FIGS. 3 and 4 of the drawings to the phantom line position also illustrated in these figures. As a consequence of this movement, both the cam face 186 on the arm 184 connected with the pinch roller mount 176 and the follower 210 on the motor mounting arm 204 will ride free of the control arm carried pin 194 and the cam face 212 thereon, respectively. As a result, the motor drive shaft 202 will be biased in full frictional engagement with the drive wheel 208 and the pinch roller 60 will be biased against the tape loop 28a to retain same in driving engagement with the capstan 58.

As shown most clearly in FIGS. 4 and 7, the capstan drive wheel 208 supports a thin transparent disc 218 which carries a series of radiating opaque lines (not shown) but which are discernible by a photoelectric detector 220 (FIG. 4) to generate a pulse series at a frequency determined by the rotational velocity of the disc 218 and thus of the capstan 58. The detector unit 220 includes both a light source such as a light emitting diode and a photo cell (not shown) positioned on opposite sides of the disc 218 and the signals generated thereby are fed to an electronic control for the motor 200. The unit 220 is supported from the plate 62 by the bracket 168 described above with reference to FIGS. 11 and 12.

Finally, it will be noted that the door 38 of the camera 10 is provided with a projecting lug 222 positioned to overlie and engage a striker foot 224 on the ramp member 108.

Figure 13:
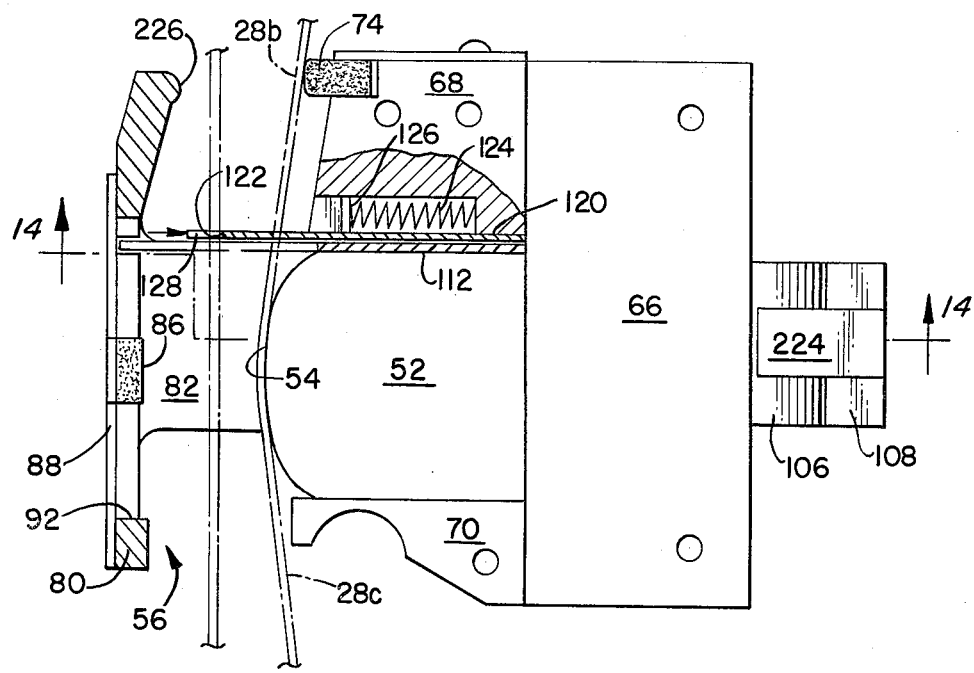
FIG. 13 is an enlarged fragmentary plan view in partial cross-section of transducer head housing mounted components.
Figure 14:
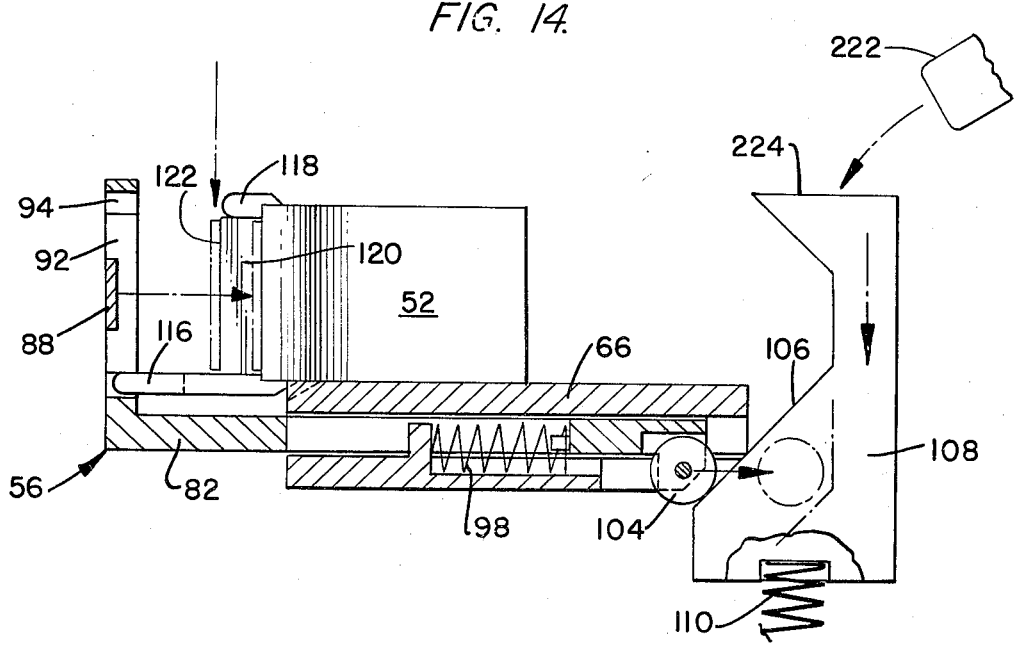
FIG. 14 is a fragmentary cross-section on line 14—14 of FIG. 13.

In light of the preceeding description of structural components, operation of the sound module 50 and related components may be understood with reference primarily to FIGS. 1–3, 7, 8, 13 and 14 of the drawings. With the door 38 in the open position shown in FIG. 1 of the drawings, the cassette 20 is inserted into the pocket or well 18 in a way so that final movement of the cassette results in an inward pivotal movement of the top wall 46 thereof. The sound tape loop 28a will project from the top wall of the cassette in a generally bowed configuration which may be determined, for example, by a relatively rigid and shaped leader portion of the sound tape 28. With the door in the open position shown in FIG. 1, the ramp member 108 will be biased upwardly to its protruding position by the spring 110, causing the guide shoe 56 to be urged against the bias of the spring 98 to a retracted position as shown in FIGS. 13 and 14. The pinch roller 60 will also be retained against the bias of the spring 188 in a retracted position by the guide shoe 56 and cam face 192 carried thereby. As a result of this spaced relationship of the guide shoe and pinch roller from the face 54 of the transducing head 60 and the capstan 58, the tape loop 28a will drop against the inner leg 116 of the fixed guide 112.

When the door 38 is closed, the lug 222 thereon will engage and depress the ramp member 108 through a distance sufficient for the ramp face 106 thereon to clear the follower roller 104 on the guide shoe 56. As a result, the guide shoe 80 will move toward the face 54 of the head 52 until the backup pad 56 yiedably retains the tape loop 28a against the face 54. Also at this time, a rounded end portion 226 on the guide wall portion 80 of the guide shoe 56 will urge the tape loop 28a against the drag felt 74 fixed to the head housing 64.

Figure 7A:
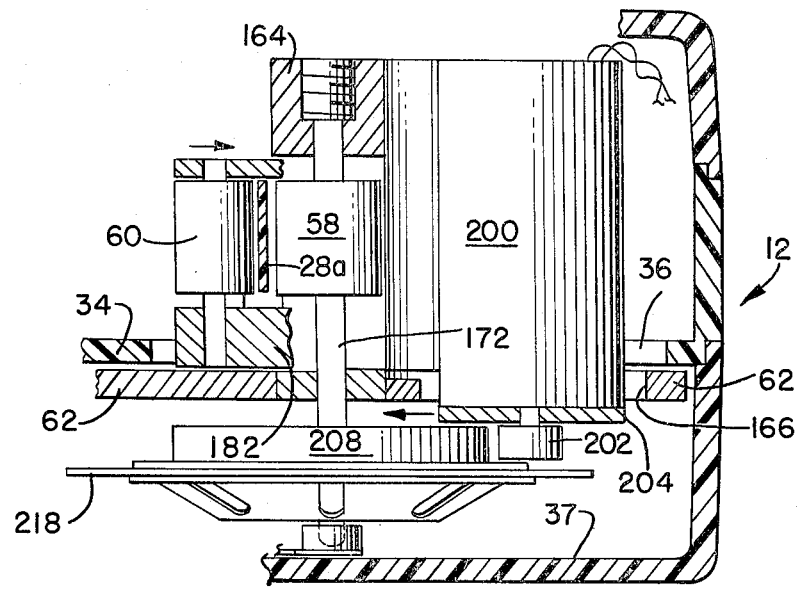
FIGS. 7A and 7B are fragmentary cross-sections on line 7—7 of FIG. 2 and depicting illustrated components in different operating positions.
Figure 7B:
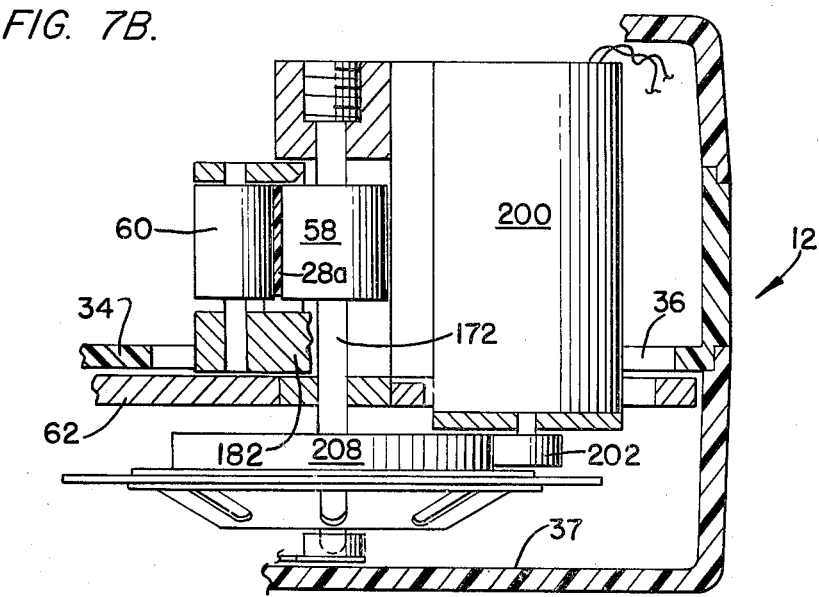
Figure 8:
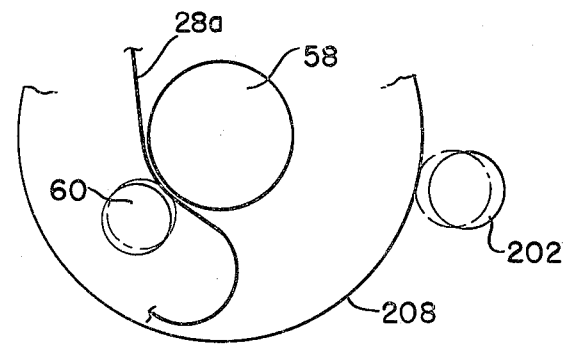
FIG. 8 is a schematic plan view of components illustrated in FIGS. 7A and 7B.

Simultaneously with movement of the guide shoe 56 to its completely operative position, the pinch roller 60 will be pivoted under the bias of the tension spring 188 extending between the support plate 62 and the arm 184 so that the cam face 186 on the arm 184 engages the control arm pin 194 to retain the pinch roller in a ready position spaced from the tape loop 28a and the capstan 58 as shown in FIG. 7A of the drawings. Also, the control arm cam face 212 will be engaged at this time by the follower roll 210 on the motor mounting arm 204 so that the motor shaft 202 will be retained in a slightly spaced or ready position with respect to the drive wheel 208. When the camera actuating trigger 216 is depressed to initiate a sound motion picture recording sequence, the motor 200 will be energized and the control arm 196 will be pivoted free of the motor mounting arm 204 and the arm 184 so that the pinch roller 60 and the motor drive shaft 202 will be biased against the capstan and the drive wheel 208, respectively. As shown in FIG. 13, the combination and relative positioning of the drag felt 74, the head face 54 and the capstan 58 will draw the tape loop 28a past the transducing head 52 in essentially linear runs 28b and 28c in total symmetry with the transducing head 52.

On completion of the combined travel of the film strip 26 and the audio tape 28 from the supply spool 22 to the takeup spool 24, the door 38 will again be opened for removal of the cassette 20 from the camera 10. Upon opening of the door, the lug 222 will allow the ramp member 108 to advance from its depressed position to its protruding position, causing the ramp face 106 to drive the guide shoe 56 to its retracted position as shown in FIG. 14. Simultaneously with this movement, the ejector plate 122 will move so that the front edge 122 thereof becomes aligned with the outer leg 118 of the fixed guide 112. Because the pinch roller 60 has been retracted with the guide shoe, the cassette 20 may be removed from the camera without interference by components of the audio station.

Thus it will be appreciated that as a result of this invention, there is provided a unique sound module for motion picture cameras of the type referred to and by which the objectives of the invention are completely fulfilled. It will be apparent to those skilled from the foregoing description and drawing illustrations that modifications may be made in the disclosed embodiment without departure from the present invention. Accordingly, it is expressly intended that the foregoing is illustrative of a preferred embodiment only, not limiting, and that the true spirit and scope of the present invention will be determined by reference to the appended claims.

What is claimed is:

1. In a motion picture camera adapted to receive a multi-purpose cassette containing a photographic film strip and a separate audio tape, the camera having a body to support components operative to advance the film strip incrementally past a photographic station for the exposure of the film strip to successive image frames, a sound module to establish an audio station separate from said photographic station and for recording sound signals on the audio tape, said sound module comprising:

a mounting plate;
vibration damping means to secure said mounting plate to the camera body;
a transducing head having a tape engaging face;
a head housing to rigidly support said transducing head;
means to secure said head housing to said mounting plate;
an audio tape drive capstan rotatably supported by said mounting plate;
means for rotatably driving said capstan;
a pinch roller pivotally supported by said mounting plate for movement between a retracted position spaced from said capstan and an operative position against said capstan;
a tape guide shoe slidably supported by said head housing for movement between a retracted position spaced from said transducing head and an operative position in close proximity to the face of said transducing head;
a fixed tape guide supported by said head housing adjacent to said transducing head for positioning the audio tape transversely in relation to said transducing head;
yieldable means for biasing said pinch roller and said guide shoe toward the respective operative positions thereof; and
cam means for moving said pinch roller and said guide shoe to the respective retracted positions thereof.

2. The apparatus recited in claim 1, wherein the camera body includes a central wall structure having front and rear surfaces, the front surface defining part of a chamber for receiving the multi-purpose cassette, the wall structure extending beyond the chamber as an apertured sound module support wall, said mounting plate comprising a rigid T-shaped member to establish a central leg portion projecting from an elongated base portion, said mounting plate being secured at the ends of said leg and said base portion to the back face of said central wall structure.

3. The apparatus recited in claim 2, wherein said head housing overlies the central region of said mounting plate base portion and extends through the apertured module support wall to be presented at one edge of the cassette chamber.

4. The apparatus recited in claim 3, wherein said means for driving said capstan comprises an electric motor having a drive shaft at one end thereof, a motor support arm pivotally supported from said mounting plate and secured to said one end of said motor, said capstan having a central shaft extending through said mounting plate and supporting a drive wheel having a peripheral surface engageable by said motor drive shaft upon pivotal movement of said motor support arm.

5. The apparatus recited in claim 4, wherein the camera includes an actuating control member movable manually to start and stop advancement of the film strip in relation to the photographic station and to energize said electric motor, said cam means comprising a control arm connected at one end to said actuating control member and having a cam face on the other end thereof, said motor support arm being biased to pivotal movement toward said drive wheel and said cam face and having a cam follower in engagement with said cam face when said arm is positioned by a stop condition of said control member and movable to pivot the motor shaft against said drive wheel when said control member is advanced to a start condition.

6. The apparatus recited in claim 5, including a pinch roller actuating arm connected at one end to be pivotal with said pinch roller from said retracted position, and having a free end movable into abutment with said control arm when said control arm is positioned by said control member in a stop condition to hold said pinch roller in an inoperative ready position spaced out of contact with the audio tape and said capstan, said free end of said pinch roller actuating arm being disengaged from said control arm when said control member is advanced to a start condition.

7. The apparatus recited in claim 1, wherein the camera body defines a cassette chamber and includes a door movable between an open position for cassette inserting and removing access to said chamber and a closed position to enclose the cassette in said chamber, said cam means comprising a ramp member movable between protruding and depressed positions, said guide shoe having a ramp follower in engagement with said ramp member to move said guide shoe to said operative position on movement of said ramp member to said depressed position, and means carried by said door for moving said ramp member to said depressed position on movement of said door to said closed position.

8. The apparatus recited in claim 7, wherein said cam means further comprises a camming finger carried by said guide shoe and engageable with said pinch roller to move said pinch roller to said retracted position.

9. The apparatus recited in claim 1, wherein said fixed tape guide means includes inner and outer legs projecting past said transducing head face toward said guide shoe, said inner leg being of a length to span the distance between said head face and said guide shoe in said retracted position, said outer leg terminating in a rounded end spaced from said guide shoe in said retracted position to permit inserting movement of a free run of the audio tape past said outer leg into edge contact with said inner leg, said legs being spaced to guidingly engage opposite marginal edges of the audio tape when said guide shoe is in said operative position.

10. The apparatus recited in claim 9, including a tape ejector having a front edge and supported from said head housing for movement of said front edge between a retracted position behind said head face and an extended position in which said front edge is aligned with the rounded end of said outer leg, said ejector being movable between said retracted and extended positions with movement of said guide shoe between said operative and retracted positions, whereby the audio tape is displaced free of said outer leg for removal of the tape and the cassette from the camera upon movement of said guide shoe to the retracted position thereof.

11. The apparatus recited in claim 1, wherein said vibration damping means comprises a symmetrical system of post-like supports, each of said supports including an elastomeric grommet of an axial cross-sectional configuration to define an annular body having an outer peripheral surface and terminating in a pair of enlarged diameter flanges having mutually facing inner surfaces, each of said peripheral and mutually facing inner surfaces having a tapered load bearing formation projecting therefrom to engage diametrically opposed edge surfaces and oppositely facing planar faces on said mounting plate whereby increased amplitude of mounting plate movement in any direction is opposed by increased volume of said elastomeric material in said tapered formations.

12. The apparatus recited in claim 11, wherein said grommet is formed of low durometer polyurethane.

13. The apparatus recited in claim 11, wherein said mounting plate comprises a rigid T-shaped member to establish a central leg portion projecting from an elongated base portion, the free end of said central leg portion and opposite ends of said elongated base portion each being provided with a U-shaped slot formation to define the surfaces engaged by said load bearing formations.

14. The apparatus recited in claim 1, wherein said means to secure said head housing to said mounting plate comprises at least three bolts extending through said housing head and said mounting plate, each of said bolts extending through a helical compression spring engaging at opposite ends, said head housing and said mounting plate.

* * * * *